US012558881B2

(12) United States Patent (10) Patent No.: US 12,558,881 B2
Kuwajima et al. (45) Date of Patent: Feb. 24, 2026

(54) FIBER-REINFORCED COMPOSITE MATERIAL

(71) Applicant: DAIKIN INDUSTRIES, LTD., Osaka (JP)

(72) Inventors: Yuuki Kuwajima, Osaka (JP); Hayato Tsuda, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 267 days.

(21) Appl. No.: 18/338,777

(22) Filed: Jun. 21, 2023

(65) Prior Publication Data

US 2023/0347634 A1 Nov. 2, 2023

Related U.S. Application Data

(63) Continuation of application No. PCT/JP2021/046610, filed on Dec. 16, 2021.

(30) Foreign Application Priority Data

Dec. 25, 2020 (JP) ................................. 2020-217652

(51) Int. Cl.
*B32B 27/12* (2006.01)
*B32B 5/02* (2006.01)
*B32B 27/30* (2006.01)

(52) U.S. Cl.
CPC ................ *B32B 27/12* (2013.01); *B32B 5/02* (2013.01); *B32B 27/304* (2013.01); *B32B 2260/021* (2013.01); *B32B 2260/046* (2013.01); *B32B 2307/54* (2013.01); *B32B 2597/00* (2013.01)

(58) Field of Classification Search
CPC ......... B32B 27/12; B32B 27/304; B32B 5/02; B32B 2260/021; B32B 2260/046; B32B 2307/54; B32B 2597/00
See application file for complete search history.

(56) References Cited

U.S. PATENT DOCUMENTS

| | | | |
|---|---|---|---|
| 2014/0106166 A1 | 4/2014 | Nelson et al. | |
| 2019/0137012 A1 | 5/2019 | Kuwajima et al. | |
| 2020/0298542 A1 | 9/2020 | Kuwajima et al. | |
| 2020/0338872 A1 | 10/2020 | Ozawa et al. | |
| 2021/0086403 A1* | 3/2021 | Savart ....................... | B32B 5/26 |
| 2021/0253841 A1* | 8/2021 | Xie .......................... | C08L 27/12 |

FOREIGN PATENT DOCUMENTS

| | | |
|---|---|---|
| CN | 110603284 A | 12/2019 |
| JP | 2007-314720 A | 12/2007 |
| KR | 10-2014-0015462 A | 2/2014 |
| WO | 2017/191735 A1 | 11/2017 |
| WO | 2018/207446 A1 | 11/2018 |
| WO | 2019/203099 A1 | 10/2019 |

OTHER PUBLICATIONS

International Preliminary Report on Patentability dated Jun. 13, 2023 with translation of the Written Opinion in Application No. PCT/JP2021/046610.
International Search Report for PCT/JP2021/046610, dated Mar. 1, 2022.

* cited by examiner

*Primary Examiner* — Jeremy R Pierce
(74) *Attorney, Agent, or Firm* — Sughrue Mion, PLLC

(57) ABSTRACT

A fiber-reinforced composite material containing a carbon fiber and a fluororesin, and having a tensile elasticity measured under specific conditions of 40 GPa or more.

5 Claims, 5 Drawing Sheets

FIBER-REINFORCED COMPOSITE MATERIAL

CROSS-REFERENCE TO RELATED APPLICATIONS

This application is a Rule 53(b) Continuation of International Application No. PCT/JP2021/046610 filed Dec. 16, 2021, which claims priority based on Japanese Patent Application No. 2020-217652 filed Dec. 25, 2020, the respective disclosures of which are incorporated herein by reference in their entirety.

TECHNICAL FIELD

The present disclosure relates to a fiber-reinforced composite material.

BACKGROUND ART

Patent Document 1 discloses, as a fiber-reinforced composite material containing a fluororesin as a matrix, a sheet comprising a carbon fiber and a fluororesin layer disposed around a carbon monofilament constituting the carbon fiber, wherein a fluororesin constituting the fluororesin layer is polyvinylidene fluoride, and the sheet has a tensile strength of 400 MPa or higher.

Patent Document 2 discloses a laminate comprising a fiber-reinforced resin layer which comprises a reinforcing fiber base material and a resin component containing at least 50 vol % of the following fluororesin, wherein the ratio of the volume of the reinforcing fiber base material to the total volume of the reinforcing fiber base material and the resin component is from 0.30 to 0.70, and a substrate which comprises metal, paper, glass, or a resin component containing more than 50 vol % of the following non-fluororesin, wherein at least one outermost layer is the fiber-reinforced resin layer, and the ratio of the total thickness of the fiber-reinforced resin layer to the total thickness of the substrate is from 1/99 to 30/70.

Fluororesin: a melt-formable fluororesin having at least one type of functional group selected from the group consisting of a carbonyl group-containing group, a hydroxy group, an epoxy group, an amide group, an amino group and an isocyanate group, and having a melting point of from 100 to 325° C.

Non-fluororesin: a cured product of a thermosetting resin or a thermoplastic resin, containing no fluorine atom.

CITATION LIST

Patent Documents

Patent Document 1: International Publication No. WO 2018/207446

Patent Document 2: International Publication No. WO 2019/203099

SUMMARY

According to the present disclosure, there is provided a fiber-reinforced composite material comprising a carbon fiber and a fluororesin, and having a tensile elasticity measured under the following conditions of 40 GPa or more.

(Measurement Conditions of Tensile Elasticity)

The measurement is carried out in accordance with ASTM D3039-17 except that the following conditions are adopted:

clip: manufactured by Instron Corporation, model 2580-301, capacity±100 kN;

strain gauge: manufactured by Tokyo Measuring Instruments Laboratory Co., Ltd., model: FLA-6-11-3LJCT; and tensile rate: 2 mm/min.

Effects

According to the present disclosure, it is possible to provide a fiber-reinforced composite material that is excellent in mechanical strength and can be used for a structural member to which a load is applied.

DESCRIPTION OF EMBODIMENTS

Figure 1A:
FIGS. 1A to 1C each are schematic views of examples of a shape of a tape.

Hereinafter, specific embodiments of the present disclosure will now be described in detail, but the present disclosure is not limited to the following embodiments.

A fiber-reinforced composite material of the present disclosure contains a carbon fiber and a fluororesin. The fiber-reinforced composite material of the present disclosure has a tensile elasticity of 40 GPa or more despite containing a carbon fiber and a fluororesin.

The tensile elasticity of conventional fiber-reinforced composite materials is about 11 GPa. In the fiber-reinforced composite material of the present disclosure, by appropriately selecting the constituent materials thereof, the tensile elasticity is surprisingly improved as compared with conventional fiber-reinforced composite materials, and the fiber-reinforced composite material can be used for a structural member which has not been easily used in the related art.

In the present disclosure, the tensile elasticity is measured under the following conditions.

(Measurement Conditions of Tensile Elasticity)

The measurement is carried out in accordance with ASTM D3039-17 except that the following conditions are adopted:

clip: manufactured by Instron Corporation, model 2580-301, capacity±100 kN;

strain gauge: manufactured by Tokyo Measuring Instruments Laboratory Co., Ltd., model: FLA-6-11-3LJCT; and tensile rate: 2 mm/min.

This measurement method is different from the conventional measurement method of the tensile elasticity, and can be used as an index of how much the mechanical strength required when the fiber-reinforced composite material is applied to a structural member is satisfied. A higher tensile elasticity measured by the above measurement method means that the fiber-reinforced composite material is less likely to be broken even when a large load is applied to the fiber-reinforced composite material when the fiber-reinforced composite material is applied to a structural member.

The tensile elasticity of the fiber-reinforced composite material is 40 GPa or more, preferably 60 GPa or more, more preferably 80 GPa or more, and still more preferably 100 GPa or more. The upper limit of the tensile elasticity of the fiber-reinforced composite material is not limited, and the higher the better, but from the viewpoint of obtaining a fiber-reinforced composite material excellent in balance of various properties, the upper limit is preferably 300 GPa or less, more preferably 200 GPa or less, still more preferably 150 GPa or less, and particularly preferably 130 GPa or less.

The maximum point stress of the fiber-reinforced composite material of the present disclosure is preferably 600 MPa or more, more preferably 800 MPa or more, still more preferably 1,000 MPa or more, and particularly preferably 1,100 MPa or more. The upper limit may be 10,000 MPa.

The maximum point elongation of the fiber-reinforced composite material of the present disclosure is preferably 0.5% or more, more preferably 0.7% or more, still more preferably 0.9% or more, and particularly preferably 1.1% or more. The upper limit may be 100%.

The maximum point stress and the maximum point elongation of the fiber-reinforced composite material can be measured by the method described above as the method for measuring the tensile elasticity of the fiber-reinforced composite material.

The fiber-reinforced composite material of the present disclosure contains a carbon fiber. The carbon fiber is preferably contained in the fiber-reinforced composite material as a carbon fiber base material.

The carbon fiber preferably includes carbon monofilaments having an average fiber length of 5 mm or longer, more preferably includes carbon monofilaments having an average fiber length of 50 mm or longer, still more preferably includes carbon monofilaments having an average fiber length of 100 mm or longer, still more preferably includes carbon monofilaments having an average fiber length of 250 mm or longer, and most preferably, the carbon fiber is a continuous filament.

The carbon fiber preferably includes carbon monofilaments having an average diameter of 3 to 15 μm, more preferably includes carbon monofilaments having an average diameter of 4 to 9 μm.

The carbon monofilaments constituting the carbon fiber may be surface-treated, or may be treated with a treatment agent or a sizing agent, or may be plated with metal, for example.

The surface treatment enables introduction of an oxygen-containing functional group or a nitrogen-containing functional group to the surface of the carbon fiber, for example.

Examples of the surface treatment for the carbon fiber include liquid chemical oxidation and electro-oxidation in the liquid phase, and gas phase oxidation. From the viewpoints of productivity and processing uniformity, preferred among these surface treatments is electro-oxidation treatment in the liquid phase. Examples of an electrolyte to be used in the electro-oxidation treatment include inorganic acids such as sulfuric acid and nitric acid, inorganic hydroxides such as sodium hydroxide and potassium hydroxide, and inorganic salts such as ammonium sulfate and sodium hydrogen carbonate.

Examples of the sizing agent include surfactants such as nonionic surfactants, anionic surfactants, and amphoteric surfactants, mineral oils, and animal and vegetable oils. More specific examples thereof to be used include an ester-based compound, an alkylene glycol-based compound, a polyolefin-based compound, a phenyl ether-based compound, a polyether-based compound, a silicone-based compound, a polyethylene glycol-based compound, an amide-based compound, a sulfonate-based compound, a phosphate-based compound, a carboxylate-based compound, a fluorine-based compound, a urethane-based compound, an epoxy-based compound, an acryl-based compound, an iono-mer resin, a silane coupling agent, a polyvinyl alcohol-based compound, a polysulfone-based compound, a polyether-sulfone-based compound, a polyetherimide-based compound, a polyimide-based compound, a tertiary amine compound, mineral oil, an emulsifier, and an electrolyte compound, and a combination of two or more thereof.

In order to improve the handleability, abrasion resistance, and fluff resistance of the carbon fiber, the sizing agent may contain a known additive or auxiliary component. Examples of the additives and auxiliary components include a dispersant, a surfactant, a lubricant, and a stabilizer.

The amount of the sizing agent adhered is preferably 3% or less, more preferably 2% or less, still more preferably 1% or less, particularly preferably 0.5% or less, and preferably 0.1% or more, based on the total mass of the carbon monofilaments and the sizing agent, because a fiber-reinforced composite material having more excellent mechanical strength can be obtained.

The amount of the sizing agent adhered can be determined by washing the carbon fibers with a solvent, and calculating the mass of the carbon fibers before washing with respect to the remaining amount after volatilizing the recovered solvent. A general-purpose solvent can be used as the solvent, and acetone is preferably used.

Examples of the treatment agent include epoxy resin, urethane resin, silane coupling agents, water-insoluble poly-amides, water-soluble polyamides, fluororesin, silicone resin, and any combination of two or more of these.

The use of the treatment agent allows introduction of a functional group on the surface of the carbon monofilament. The carbon monofilament preferably has an amide group, a carboxyl group, an acid anhydride group, an alkoxycarbonyl group, a cyano group, a carbonate group, a carboxylic acid halide group, a hydroxyl group, a glycidyl group, an imide group, a urethane group, a urea group, a sulfonyl group, a sulfo group, an epoxy group, an alkylene group, a hydrocarbon group, a halogen group, a N-oxide group, a N-hydroxy group, a nitro group, a nitroso group, an azo group, a diazo group, an azide group, an oxo group, a phenyl group, a phosphino group, a thio group, a S-oxide group, a thioxy group, a peroxy group, a ketone group, an acyl group, an acetyl group, an enol group, an enamine group, a formyl group, a benzoyl group, an acetal group, a hemiacetal group, an oxime group, a thiol group, a urea group, an isonitrile group, an allene group, a thiol group, or a combination of two or more thereof on the surface.

The carbon monofilaments constituting the carbon fiber may be in the form of continuous fibers, long fibers, or staple fibers, for example. Examples of the form of the carbon fiber include, but are not limited to, a unidirectional carbon fiber sheet including carbon monofilaments paralleled in one direction, a laminate of two or more unidirectional carbon fiber sheets laminated at different angles, a sheet in which the carbon monofilaments are two dimensionally randomly oriented, fabric such as woven fabric, knitted fabric, or non-woven fabric formed from the carbon monofilaments, and a strand such as a braid. These are sometimes referred to as, for example, filament, tow, staple yarn, woven fabric (cloth), braid, chopped yarn, milled, felt, mat, or paper. The woven fabric may be a bidirectional woven fabric or a multi-axial woven fabric, for example. Two or more of these may be used in combination. In the case of a laminate, preferably, multiple layers are laminated in different directions, alternately laminated, or symmetrically placed in the thickness direction. In order to achieve excellent tensile properties, the carbon fiber is preferably in the form of a sheet, more preferably in the form of a unidirectional carbon fiber sheet including carbon fibers paralleled in one direction, woven fabric, or non-woven fabric, still more preferably in the form of a unidirectional carbon fiber sheet.

When the carbon fiber is in the form of a sheet, the sheet preferably has a thickness of 0.01 to 5 mm, more preferably 0.05 to 2.5 mm, and still more preferably 0.1 to 2 mm.

Examples of the sheet-shaped carbon fiber include products of Toray Industries, Inc., such as CO6142, CO6151B, CO6343, CO6343B, CO6347B, CO6644B, CO1302, CO1303, CO5642, CO7354, CO7359B, CK6244C, CK6273C, CK6261C, UT70-20G, UT70-30G, UT70-40G, UT70-45G, UT70-60G, UM46-30G, UM46-34G, UM46-40G, BT70-20, and BT70-30, products of Mitsubishi Rayon Co., Ltd., such as TR3110M, TR3523M, TR6110HM, TR6120HM, TRK101M, TRK510M, TR3160TMS, TR3163TMS, TRK979PQRW, and TRK976PQRW, and products of Toho Tenax Co., Ltd., such as W-1103, W-1104, W-3101, W-310A, W-3104, W-3108, W-310F, W-3112, W-3121, W-3161, W-3162, W-6101, W-6110, W-6E01, W-7101, W-7161, W-7U61, W-3801, W-3802, W-3302, W-3303, and W-3304.

Examples of the carbon fiber include polyacrylonitrile-based, pitch-based, rayon-based, cellulose-based, lignin-based, phenol-based, and vapor-deposited carbon fibers. The carbon fiber is preferably a polyacrylonitrile-based, pitch-based, or rayon-based carbon fiber, and in particular, a polyacrylonitrile-based carbon fiber is preferably used in view of excellent tensile strength.

Examples of the polyacrylonitrile-based carbon fiber include products of Toray Industries, Inc., such as T300, T300B, T400HB, T700SC, T800SC, T800HB, T830HB, T1000 GB, T1100GC, M35JB, M40JB, M46JB, M50JB, M55J, M55JB, M60JB, and M30SC, products of Mitsubishi Rayon Co., Ltd., such as TR30S3L, TR50S6L, TR50S12L, TR50S15L, TR50D12L, TRH50 18M, TRH50 60M, and TRW40 50L (HT series), MR60H24P (IM series), MS40 12M, HR40 12M, and HS40 12P (HM series), and 34-700 and 37-800 (HT series), and products of Toho Tenax Co., Ltd., such as HTA40, HTS40, HTS45, STS40, UTS50, =40, IMS60, IMS65, HWA35, UMS40, UMS45, UMS55, and HTS40MC.

The tensile elasticity of the carbon fiber (monofilament tensile elasticity) is preferably 100 to 1,000 GPa, and more preferably 200 to 500 GPa, in order to further increase the tensile strength of the fiber-reinforced composite material. The tensile strength of the carbon fiber (monofilament tensile strength) is preferably 2,000 to 10,000 MPa, and more preferably 3,000 to 8,000 MPa, in order to further increase the tensile strength of the fiber-reinforced composite material.

The tensile elasticity of the polyacrylonitrile-based carbon fiber as the carbon fiber is preferably 100 to 1,000 GPa, and more preferably 200 to 500 GPa, in order to further increase the tensile strength of the fiber-reinforced composite material. The tensile strength of the polyacrylonitrile-based carbon fiber as the carbon fiber is preferably 2,000 to 10,000 MPa, and more preferably 3,000 to 8,000 MPa, in order to further increase the tensile strength of the fiber-reinforced composite material.

The tensile elasticity and the tensile strength are determined in accordance with JIS R7606(2000).

The fiber-reinforced composite material of the present disclosure contains a fluororesin. The fluororesin is preferably contained as a matrix resin in the fiber-reinforced composite material.

The fluororesin used in the fiber-reinforced composite material of the present disclosure is a partially crystalline fluoropolymer, and is not a fluoroelastomer but a fluoroplastic. The fluororesin has a melting point and thermoplasticity. The fluororesin may be melt-fabricable or non-melt-processable, but is preferably a melt-fabricable fluororesin.

As used herein, the term melt-fabricable means that a polymer can be melted and processed using a conventional processing apparatus such as an extruder and an injection molding machine. Accordingly, a melt-fabricable fluororesin usually has a melt flow rate of 0.01 to 500 g/10 minutes.

The melting point of the fluororesin is preferably 150° C. or more, more preferably 170° C. or more, still more preferably 180° C. or more, particularly preferably 190° C. or more, and most preferably 200° C. or more, and is preferably 320° C. or less, more preferably 300° C. or less, still more preferably 280° C. or less, particularly preferably 260° C. or less, and most preferably 253° C. or less.

The melt flow rate (MFR) of a fluororesin at any temperature (for example, 230° C. or 297° C.) in the range of 230 to 350° C., which is the general forming temperature range, is preferably 0.5 g/10 minutes or more, more preferably 1.0 g/10 minutes or more, still more preferably 1.5 g/10 minutes or more, particularly preferably 2.0 g/10 minutes or more, and most preferably 2.5 g/10 minutes or more, and preferably 100 g/10 minutes or less, more preferably 50 g/10 minutes or less, still more preferably 40 g/10 minutes or less, and particularly preferably 35 g/10 minutes or less. The melt flow rate can be identified, for example, by measuring the mass (g) of fluororesin flowing out of a nozzle having an inner diameter of 2 mm and a length of 8 mm per unit time (10 minutes) at a predetermined temperature (for example, 230° C. or 297° C.) and under a predetermined load (for example, 2.16 kg or 5 kg) using a melt indexer.

The fluororesin preferably contains chlorine atoms because a fiber-reinforced composite material having more excellent mechanical strength can be obtained. It was found that by using a fluororesin containing chlorine atoms as a fluororesin, the mechanical strength of the fiber-reinforced composite material was remarkably improved, resulting in a fiber-reinforced composite material that can be used for structural members subjected to be under load.

The chlorine atom content of the fluororesin is preferably 1.5% by mass or more, more preferably 3.0% by mass or more, still more preferably 4.0% by mass or more, particularly preferably 5.0% by mass or more, most preferably 6.0% by mass or more, and preferably 40% by mass or less, more preferably 35% by mass or less, and still more preferably 31% by mass or less, because a fiber-reinforced composite material having more excellent mechanical strength can be obtained.

The fluororesin preferably contains chlorotrifluoroethylene (CTFE) unit. The content of the CTFE unit in the fluororesin is preferably 15 mol % or more, more preferably 18 mol % or more, based on all the polymerization units constituting the fluororesin, with the preferred upper limit being 100 mol %.

The fluororesin is preferably at least one selected from the group consisting of a polychlorotrifluoroethylene (PCTFE) and a chlorotrifluoroethylene (CTFE) copolymer, more preferably at least one selected from the group consisting of a PCTFE, a CTFE/tetrafluoroethylene (TFE) copolymer, and an ethylene/CTFE copolymer, and still more preferably a PCTFE and a CTFE/TFE copolymer, because a fiber-reinforced composite material having more excellent mechanical strength can be obtained.

Examples of a PCTFE include a CTFE homopolymer and a polymer containing CTFE unit and small amounts of a comonomer unit.

The melting point of PCTFE is preferably 150 to 230° C., and more preferably 190 to 217° C. The melting point is a temperature corresponding to the maximum value in the heat-of-fusion curve when the heated at a rate of 10° C./min using a differential scanning calorimeter (DSC).

The flow value of PCTFE is preferably $1\times10^{-4}$ to $5\times10^{-1}$ (cm³/sec). The flow value is the volume of resin extruded per second when PCTFE is melted at 230° C. by an up-and-down flow tester CFT-500D (manufactured by Shimadzu Corporation) and extruded from a nozzle diameter of 1 mmφ under a load of 100 kg.

The content of the CTFE unit in PCTFE is preferably from 95 to 100 mol %, more preferably from 98 to 100 mol %, and still more preferably from 99 to 100 mol %.

The comonomer constituting the comonomer unit which can be contained in PCTFE is not limited as long as it is a monomer copolymerizable with CTFE, and examples thereof include TFE, ethylene, vinylidene fluoride, a perfluoroalkyl vinyl ether, and hexafluoropropylene.

The CTFE copolymer is preferably a copolymer containing CTFE unit and a unit derived from at least one monomer selected from the group consisting of TFE, hexafluoropropylene (HFP), a perfluoroalkylvinylether (PAVE), vinylidenefluoride (VDF), vinyl fluoride, hexafluoroisobutene, a monomer represented by the formula: $CH_2{=}CX^1(CF_2)_nX^2$, wherein $X^1$ is H or F, $X^2$ is H, F, or Cl, and n is an integer of 1 to 10, ethylene, propylene, 1-butene, 2-butene, vinylchloride, and vinylidenechloride.

The CTFE copolymer is more preferably at least one selected from the group consisting of an ethylene/CTFE copolymer and a copolymer containing CTFE unit and a unit derived from at least one monomer selected from the group consisting of TFE, HFP, and a PAVE.

The ethylene/CTFE copolymer (ECTFE) is preferably a copolymer containing ethylene unit and CTFE unit and containing 46 to 52 mol % of the ethylene unit and 54 to 48 mol % of the CTFE unit based on the total of the ethylene unit and the CTFE unit. ECTFE may be a binary copolymer consisting only of ethylene unit and CTFE unit, or may contain, in addition to the ethylene unit and CTFE unit, a polymerization unit based on a monomer copolymerizable with ethylene and CTFE (for example, PAVE). The content of the polymerization unit based on the monomer copolymerizable with ethylene and CTFE is preferably 0.01 to 5 mol % based on the total of the ethylene unit, the CTFE unit, and the polymerization unit based on the copolymerizable monomer.

The MFR of ECTFE is preferably 0.01 to 100 g/10 minutes. The MFR of ECTFE is measured at a temperature of 230° C. and a load of 2.16 kg.

The CTFE copolymer is preferably a copolymer containing CTFE unit and TFE unit (CTFE/TFE copolymer).

The CTFE/TFE copolymer is particularly preferably one containing CTFE unit, TFE unit and a monomer (a) unit derived from a monomer (a) copolymerizable therewith.

The monomer (a) is not limited as long as it is a monomer copolymerizable with CTFE and TFE, and examples include ethylene (Et), VDF, a perfluoro(alkyl vinyl ether) [PAVE] represented by $CF_2{=}CF{-}ORf^1$, wherein $Rf^1$ is a perfluoroalkyl group having 1 to 8 carbon atoms, a vinyl monomer represented by $CX^3X^4{=}CX^3(CF_2)_nX^6$, wherein $X^3$, $X^4$, and $X^5$ are the same or different and hydrogen atom or fluorine atom; $X^6$ is hydrogen atom, fluorine atom, or chlorine atom; n is an integer of 1 to 10, and an alkyl perfluorovinyl ether derivative represented by $CF_2{=}CF{-}OCH_2{-}Rf^2$, wherein $Rf^2$ is a perfluoroalkyl group having 1 to 5 carbon atoms, and in particular, at least one selected from the group consisting of PAVE, the vinyl monomer, and the alkyl perfluorovinyl ether derivative is preferable, and at least one selected from the group consisting of PAVE and HFP is more preferable.

PAVE is a preferably perfluoro(alkyl vinyl ether) represented by $CF_2{=}CF{=}ORf^3$, wherein $Rf^3$ represents a perfluoroalkyl group having 1 to 5 carbon atoms, such as perfluoro(methyl vinyl ether) [PMVE], perfluoro(ethyl vinyl ether) [PEVE], perfluoro(propyl vinyl ether) [PPVE], and perfluoro (butyl vinyl ether), in particular more preferably at least one selected from the group consisting of PMVE, PEVE, and PPVE, and still more preferably PPVE.

In the alkyl perfluorovinyl ether derivative, $Rf^2$ is preferably a perfluoroalkyl group having 1 to 3 carbon atoms, and more preferably $CF_2{=}CF{-}OCH_2{-}CF_2CF_3$.

The CTFE/TFE copolymer preferably contains 10 to 95 mol % of the CTFE unit and 90 to 5 mol % of the TFE unit, more preferably contains 15 to 90 mol % of CTFE unit and 85 to 10 mol % of TFE unit, still more preferably contains 15 to 50 mol % of CTFE unit and 85 to 50 mol % of TFE unit, and particularly preferably contains 15 to 25 mol % of CTFE unit and 85 to 75 mol % of TFE unit.

The CTFE/TFE copolymer preferably contains 90 to 99.9 mol % of the CTFE unit and also preferably the TFE unit in total and 0.1 to 10 mol % of the monomer (a) unit.

The CTFE/TFE copolymer is particularly preferably a CTFE/TFE/PAVE copolymer. In the CTFE/TFE/PAVE copolymer, examples of PAVE include perfluoro(methyl vinyl ether) [PMVE], perfluoro(ethyl vinyl ether) [PEVE], perfluoro(propyl vinyl ether) [PPVE] and perfluoro(butyl vinyl ether), and among them, at least one selected from the group consisting of PMVE, PEVE and PPVE is preferred, and PPVE is more preferred. In the CTFE/TFE/PAVE copolymer, the content of the PAVE unit is preferably 0.5 mol % or more, and more preferably 2.0 mol % or more, and preferably 5 mol % or less, and more preferably 4 mol % or less, based on all the polymerization units.

The contents of the respective monomers in the fluororesin can be calculated by appropriate combination of NMR and elemental analysis depending on the types of the monomers.

The melting point of the CTFE/TFE copolymer is preferably 150° C. or more, more preferably 170° C. or more, still more preferably 190° C. or more, particularly preferably 210° C. or more, and most preferably 230° C. or more, and is preferably less than 324° C., more preferably 320° C. or less, still more preferably 270° C. or less.

The MFR (297° C.) of the CTFE/TFE copolymers is preferably 0.5 g/10 minutes or more, more preferably 2.0 g/10 minutes or more, still more preferably 3.0 g/10 minutes or more, particularly preferably 4.0 g/10 minutes or more, and most preferably 5.0 g/10 minutes or more, and preferably 100 g/10 minutes or less, more preferably 50 g/10 minutes or less, still more preferably 40 g/10 minutes or less, and particularly preferably 35 g/10 minutes or less. The MFR of the CTFE/TFE copolymers is measured at a temperature of 297° C. under a load of 5 kg.

The fluororesin preferably has a reactive functional group because a fiber-reinforced composite material having more excellent mechanical strength can be obtained. The reactive functional group is preferably at least one selected from the group consisting of a carbonyl group, a hydroxyl group, a heterocyclic group, and an amino group.

In terms of the ease of introduction and in terms of suitable heat resistance and good adhesion at a relatively low temperature of the fluororesin, the reactive functional group is preferably an amide group, a carbamoyl group, a hydroxyl group, a carboxyl group, a carbonate group, a carboxylic acid halide group, and an acid anhydride bond, and more preferably an amide group, a carbamoyl group, a hydroxyl group, a carbonate group, a carboxylic acid halide group, and an acid anhydride bond.

Among them, the reactive functional group is preferably at least one selected from the group consisting of a carbonate group and a carboxylic acid halide group. The carbonate group and the carboxylic acid halide group may be groups described in International Publication No. WO 99/45044.

The fluororesin may be a polymer having a reactive functional group either at a main-chain end or in a side chain of the polymer, or may be a polymer having a reactive functional group both at a main-chain end and in a side chain. When the polymer has a reactive functional group at a main-chain end, the polymer may have a reactive functional group at both ends of the main chain, or may have a reactive functional group only at one end. When the reactive functional group also has an ether bond, the polymer may further have the reactive functional group in the main chain.

The fluororesin is preferably a polymer having a reactive functional group at a main-chain end because it does not impair mechanical properties and chemical solution resistance remarkably or because it is advantageous in terms of productivity and cost.

The number of reactive functional groups is preferably 3 to 800, more preferably 15 or more, still more preferably 30 or more, and particularly preferably 50 or more, and preferably 400 or less, and more preferably 300 or less, per $10^6$ main-chain carbon atoms, because a fiber-reinforced composite material having more excellent mechanical strength can be obtained. When the fluororesin has at least one selected from the group consisting of a carbonate group and a carboxylic acid halide group, the total number of carbonate groups and carboxylic acid halide groups is preferably 3 to 800, more preferably 15 or more, still more preferably 30 or more, and particularly preferably 50 or more, and preferably 400 or less, and more preferably 300 or less, per $10^6$ main-chain carbon atoms.

The number of reactive functional groups can be determined in the following manner: a film sheet having a thickness of 50 to 200 μm obtained by compression-molding a fluororesin at a molding temperature 50° C. higher than the melting point thereof under a molding pressure of 5 MPa is analyzed for an infrared absorption spectrum using an infrared spectrophotometer; the obtained infrared absorption spectrum is compared with the infrared absorption spectrum of a known film to determine the type of characteristic absorption of the reactive functional group; and the number is calculated from spectral differences according to the following formula.

$$\text{Number of reactive functional groups } (per\ 10^6 \text{ main chain carbon atoms}) = (l \times K)/t$$

l: absorbance
K: correction coefficient
t: film thickness (mm)
Table 1 shows the correction coefficients for the end reactive functional groups of interest.

TABLE 1

| End group | Absorption frequency ($cm^{-1}$) | Correction coefficient |
|---|---|---|
| —OC(=O)O—R | 1817 | 1426 |
| —COF | 1884 | 405 |
| —COOH | 1813, (1795-1792), 1775 | 455 |
| —COOCH$_3$ | 1795 | 355 |
| —CONH$_2$ | 3438 | 408 |
| —CH$_2$OH | 3648 | 2325 |

The correction coefficients in Table 1 are values that have been determined from the infrared absorption spectra of model compounds in order to calculate the number of reactive functional groups per $10^6$ main-chain carbon atoms.

The fiber-reinforced composite material of the present disclosure is preferably obtained by combining a fluororesin film or powder and carbon fibers, more preferably obtained by combining a fluororesin film or powder and sheet-shaped carbon fibers, still more preferably obtained by combining a fluororesin film or powder and a unidirectional carbon fiber sheet, and still more preferably obtained by combining a fluororesin film and a unidirectional carbon fiber sheet.

In the fiber-reinforced composite material of the present disclosure, it is also preferable that at least a part of the carbon monofilament constituting the carbon fiber is impregnated with a fluororesin. It is also preferable that at least a part of the carbon monofilament is embedded in a fluororesin film. It is also preferable that at least a part of the carbon monofilament penetrates into a fluororesin film.

The combining can be carried out, for example, by forming the fluororesin to obtain a film and then heat-pressing the film and the carbon fiber. The carbon fiber is preferably in the form of a sheet, and more preferably a unidirectional carbon fiber sheet. When a sheet-shaped carbon fiber or unidirectional carbon fiber sheet is used, the carbon fiber may be opened. When a sheet-shaped carbon fiber or unidirectional carbon fiber sheet is used, a fluororesin film can be placed on both sides of the carbon fiber and then combined by heat-pressing, or it can be combined after layers are laminated.

The film used for combining can be obtained by forming a fluororesin using extrusion forming, press molding, or other methods.

The maximum point stress of the fluororesin film is preferably 5 to 500 MPa, and more preferably 10 to 100 MPa.

The maximum point elongation of the fluororesin film is preferably 50 to 2,000%, and more preferably 100 to 1,000%.

The tensile elasticity of the fluororesin film is preferably 0.1 to 30 GPa, and more preferably 0.2 to 2 GPa.

The maximum point stress, maximum point elongation, and tensile elasticity of the fluororesin film are determined in accordance with ASTM D638.

In the fiber-reinforced composite material, the mass ratio of the fluororesin to the carbon fiber (fluororesin:carbon fiber) is preferably 10:90 to 90:10, more preferably 20:80 to 80:20, still more preferably 30:70 to 70:30, and most preferably 40:60 to 60:40, in order to further increase the tensile strength, tensile elasticity, and tensile elongation of the fiber-reinforced composite material.

The fiber-reinforced composite material may further contain components other than the fluororesin and the carbon fiber. Examples of the other components include fillers, plasticizers, processing aids, mold release agents, pigments, flame retarders, lubricants, light stabilizers, weathering agents, conducting agents, antistatic agents, ultraviolet absorbers, antioxidants, foaming agents, perfumes, oils, flexibilizers, dehydrofluorinating agents, nucleating agents, softeners, surfactants, and penetration aids.

Examples of the fillers include polytetrafluoroethylene, mica, silica, talc, cerite, clay, titanium oxide, and barium sulfate. An example of the conducting agents is carbon black. Examples of the plasticizers include dioctyl phthalic acid and pentaerythritol. Examples of the processing aids include carnauba wax, sulfone compounds, low molecular weight polyethylene, and fluorine-based aids. Examples of the dehydrofluorinating agents include organic oniums and amidines.

In the fiber-reinforced composite material, multiple fluororesins may be blended, other resins other than fluororesins may be blended, or other rubbers may be blended. Among them, a blend with at least one selected from the group consisting of polyetheretherketone (PEEK) and polytetrafluoroethylene (PTFE) is preferred.

The fiber-reinforced composite material of the present disclosure is preferably a tape. The tape is preferably a band-like article having flexibility that allows the tape to be coiled (wrapped).

The tape of the present disclosure may have any shape as long as it has substantially band-like shape, and examples thereof are as follows.

(1) Those Having a Rectangular Cross Section

The tape of Embodiment (1) has a simple shape and is easy to produce. FIG. 1A shows an exemplary cross section of the tape of Embodiment (1).

(2) Those Having Thin Portions at the Respective Widthwise Ends

The tape of Embodiment (2) can be wrapped around an object without a gap by wrapping the tape such that the corresponding thin portions of adjacent wraps of the tape overlap each other in a wrapped state, and thus, even when applied to a tape layer constituting a flexible pipe for a high-temperature fluid stream, the tape can easily inhibit permeation of the high-temperature fluid to the outside. Further, overlapping of the thin portions can easily provide a tape layer having a uniform thickness.

The thin portions at the respective widthwise ends are preferably disposed on the opposite ends in the thickness direction. In other words, preferably, one thin portion is disposed on the upper end side while the other is disposed on the lower end side in the thickness direction.

Figure 1B:
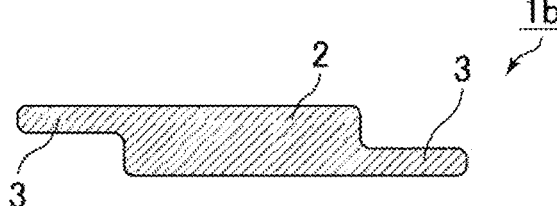

FIG. 1B shows an exemplary cross section of the tape of Embodiment (2). A tape $1b$ has thin portions 3 that are thinner than a center portion 2 at the respective widthwise ends in the thickness direction. One thin portion 3 is disposed on the upper end side while the other thin portion 3 is disposed on the lower end side in the thickness direction of the tape $1b$. It should be noted that Embodiment (2) does not include Embodiment (3) described below.

(3) Those Having a Shape with a Widthwise End being Interlockable with the Corresponding Widthwise End of an Adjacent Wrap of the Tape in a Wrapped State Examples of the tape of Embodiment (3) can include those having a cross section such as, but not limited to, a substantially Z-like shape, a substantially U-like shape, a substantially S-like shape, a substantially T-like shape, or a substantially I-like shape. The tape of Embodiment (3) can provide a tape layer in which the wraps of the tape are interlocked with each other by wrapping the tape such that a widthwise end of one wrap of the tape is engaged with the corresponding widthwise end of an adjacent wrap of the tape in a wrapped state. Thus, when applied to a tape layer constituting a flexible pipe for a high-temperature fluid stream, the tape can be prevented from shifting during bending or twisting of the flexible pipe. This can more securely prevent outflow of the fluid passing through the flexible pipe.

The tape of Embodiment (3) particularly preferably has a substantially Z-like cross section. Specifically, the tape preferably has thin portions at the respective widthwise ends and has protrusions extending from the respective thin portions at the widthwise ends in the opposite directions (counter directions) in the thickness direction. This tape has key-like portions (key portions) at the respective widthwise ends, and thus can provide a tape layer in which the wraps of the tape are interlocked with each other by wrapping the tape such that the key portions of adjacent wraps of the tape are engaged with each other, in other words, by wrapping the tape such that a recess defined by a protrusion and a thin portion of one wrap of the tape is fit into the corresponding protrusion of an adjacent wrap of the tape in a wrapped state.

Figure 1C:
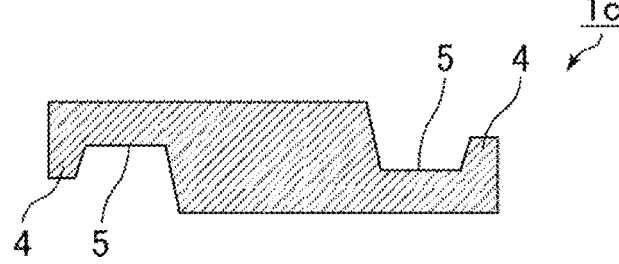

FIG. 1C shows an exemplary cross section of the tape of Embodiment (3). A tape $1c$ has a substantially Z-like cross section. The tape $1c$ has thin portions 5 at the respective widthwise ends, and further has protrusions 4 extending from the two thin portions 5 in the opposite directions (counter directions) in the thickness direction.

The tape of the present disclosure is particularly preferably the tape of Embodiment (3).

The tape of the present disclosure can be produced by forming the fluororesin and the carbon fiber, if necessary together with any of the above different components, by a technique such as extrusion forming, pultrusion, press molding, melt infiltration, extrusion laminating, or dry powder coating. Any of these forming techniques may be combined. The carbon fiber to be used is preferably wound. Alternatively, the fluororesin, if necessary together with any of the above different components, may be processed into filaments, the filaments may be woven into a woven tape with a desired shape, and the woven tape may be combined with the carbon fiber.

The pultrusion, the dry powder coating, and the extrusion laminating may be performed by the methods described in the following literature: Ben Goichi, "Molding and properties of continuous fiber FRTP (Renzoku seni FRTP no Seikei hou to Tokusei)", The Nikkan Kogyo Shimbun, Ltd., Mar. 30, 2015, pages 75, 85, and 143.

The tape of the present disclosure may have an appropriately adjusted width, thickness, and length in accordance with the application thereof. In the case of applying the tape of the present disclosure to flexible pipes for high-temperature fluid streams such as riser tubes, the width may be 1 mm to 10 m and the thickness may be 10 μm to 5 cm, for example. The length may be determined in accordance with factors such as the amount of the tape to be used, and in the case of applying the tape to flexible pipes for high-temperature fluid streams, the length may be about 1 m to 1,000 km. These may be cut and used in lengths of 1 cm to 1 m.

The present disclosure also relates to a laminate including a first layer and a second layer that is disposed on the first layer and that includes the fiber-reinforced composite material.

One or both of the surfaces of each layer of the laminate may be treated by a technique such as plasma discharge or corona discharge. Further, an adhesive may be applied thereto. The first layer and the second layer may or may not be bonded to each other.

The first layer preferably contains a polymer. Examples of the polymer can include fluoropolymers, polyether ether ketone (PEEK), polyimide, polyether ketone, polyether ketone ketone, polyether ketone ether ketone ketone, polyamide, polyethylene, and mixtures thereof.

The laminate may further include a layer different from the first layer and the second layer. For example, in accordance with the application, a different layer may be disposed on the surface of the first layer opposite to the second layer and/or on the surface of the second layer opposite to the first layer.

The laminate is preferably a pipe or sheet. When the laminate is a pipe or sheet, the fiber-reinforced composite material is preferably a tape. In addition, when the laminate is a pipe, the first layer may be a flexible tube.

The present disclosure also relates to a pipe including a first layer and a second layer disposed on the first layer and formed from the fiber-reinforced composite material, wherein the first layer and the second layer are laminated in the given order from an inner side of the pipe, and the second layer is formed from the tape of the fiber-reinforced composite material wrapped around an outer surface of the first layer. The first layer and the second layer may or may not be bonded to each other.

The first layer is preferably a flexible tube. The flexible tube may have either a single-layer structure or a multi-layer structure. The multilayer structure may be formed by any method, preferably known sequential extrusion forming, co-extrusion forming, or the like.

The tube may be constituted by any material capable of imparting flexibility to the tube, and, for example, any of known materials used for various flexible pipes may be selected in accordance with the application. Example of the material can include polymers, and specific examples thereof include fluoropolymers, polyether ether ketone (PEEK), polyimide, polyether ketone, polyether ketone ketone, polyether ketone ether ketone ketone, polyamide, polyethylene, and mixtures thereof.

In the second layer, the tape of the fiber-reinforced composite material is preferably disposed such that the wraps of the tape are adjacent to each other in the width direction. Further, widthwise ends of adjacent wraps of the tape are preferably interlocked with each other. This embodiment can be achieved by the use of the tape of Embodiment (3), for example. The second layer may include multiple layers of the tape.

Figure 2:
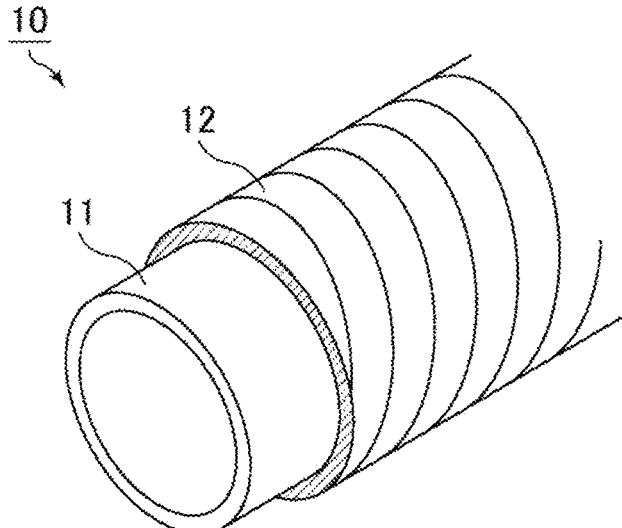
FIG. 2 is a schematic view of an example of a structure of a pipe.

In the pipe of the present disclosure, the first layer and the second layer are each in the form of a tube, and the second layer is disposed on the first layer. FIG. 2 is a schematic view of an example of the structure of the pipe of the present disclosure.

The second layer in the pipe of the present disclosure is formed by wrapping the tape around the outer surface of the first layer. When the second layer is a tape-wrapping layer formed by wrapping the tape around the outer surface of the first layer, the wraps of the tape have play therebetween and the tape does not extend when the pipe is bent, and thus, this second layer can exert an effect of preventing reduction in physical properties or deformation of the tape layer after the pipe returns to the original state.

Figure 3:
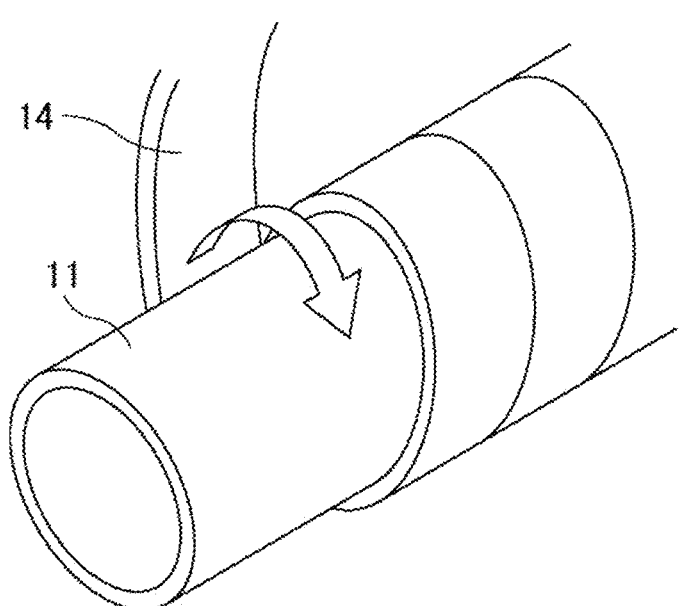
FIG. 3 is a schematic view of an example of a method for wrapping the tape.

The tape may be wrapped by any method, and is preferably wrapped spirally around the outer surface of the first layer, for example. FIG. 3 is a schematic view of an example of a method for wrapping the tape. A tape 14 (the tape of the disclosure) is spirally wrapped around the outer surface of a tubular inner layer 11 (a first layer) in the direction indicated by the arrow in the figure.

Figure 4A:
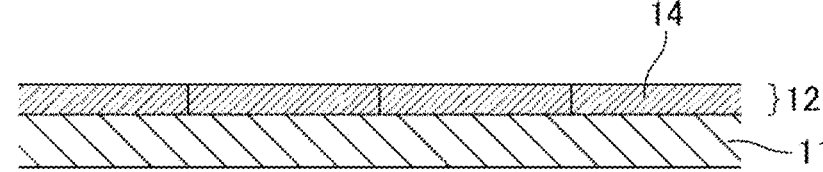
FIGS. 4A to 4E are schematic views of examples of the tape in a wrapped state.
Figure 4B:
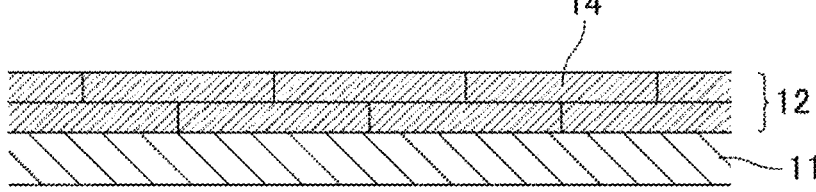

The tape may be wrapped around the outer surface of the first layer such that the corresponding widthwise ends of the adjacent wraps of the tape do not overlap each other (see, for example, FIG. 4A). In the case of wrapping the tape in multiple layers, the angle of wrapping the tape may be changed for each layer. Another piece of the tape may be further wrapped in the same manner around the outer surface of the resulting tape-wrapping layer with the wrapping position being shifted so as to cover the boundaries of the previous wrapping of the tape (see, for example, FIG. 4B). This can more securely inhibit permeation of a high-temperature fluid. In this case of wrapping the tape, the tape for the lower layer (inner layer side) and the tape for the upper layer (outer layer side) may be wrapped in the same direction, but still, the tapes are preferably wrapped in the opposite directions because the tensions applied to the pipe during wrapping are balanced and thus the tapes can be easily wrapped.

Figure 4C:
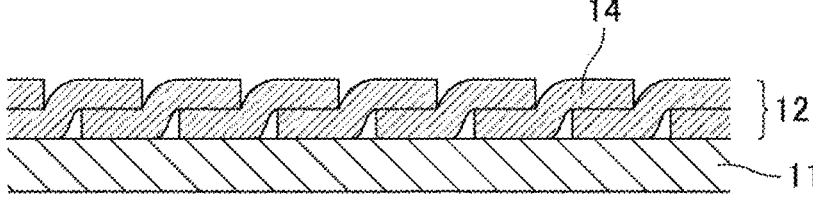

The tape may be wrapped such that the corresponding widthwise ends of the adjacent wraps of the tape overlap each other (see, for example, FIG. 4C). This can more securely inhibit permeation of a high-temperature fluid. In this embodiment, the tapes may also be wrapped in multiple layers in either the same direction or the opposite directions.

Figure 4D:
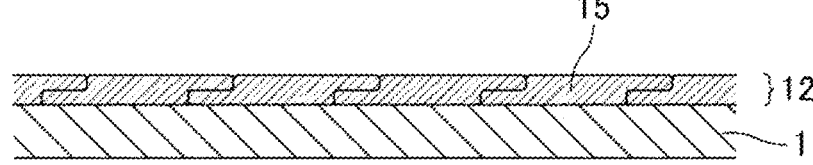

In the case of the tape having thin portions at the respective widthwise ends, the tape is preferably wrapped such that the corresponding thin portions of the adjacent wraps of the tape overlap each other (see, for example, FIG. 4D). This can more securely inhibit permeation of a high-temperature fluid. This can also easily provide a tape-wrapping layer having a uniform thickness. In this embodiment, the tapes may also be wrapped in multiple layers in either the same direction or the opposite directions.

Figure 4E:
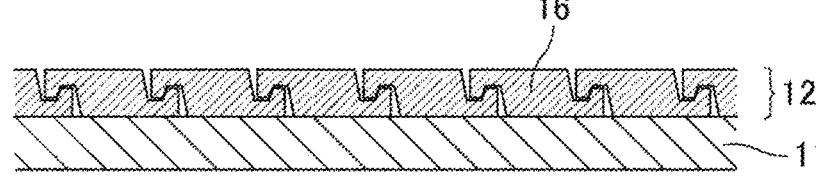

In the case of the tape having shapes that can be interlocked with each other, the tape is preferably wrapped such that the corresponding widthwise ends of the adjacent wraps of the tape are engaged with each other (see, for example, FIG. 4E). This can provide a tape-wrapping layer with the wraps of the tape interlocked with each other, and thus can prevent shifting of the tape when the pipe is bent or twisted. As a result, this can more securely inhibit permeation of a high-temperature fluid. This can also easily provide a tape-wrapping layer having a uniform thickness. In this embodiment, the tapes may also be wrapped in multiple layers in either the same direction or the opposite directions.

The tape may be wrapped using a known tape wrapper.

In the second layer, the corresponding widthwise ends of the adjacent wraps of the tape are preferably interlocked with each other. This embodiment may be achieved by wrapping the tape of Embodiment (3) around the outer surface of the first layer such that the corresponding widthwise ends of the adjacent wraps of the tape are engaged with each other, for example.

Figure 5:
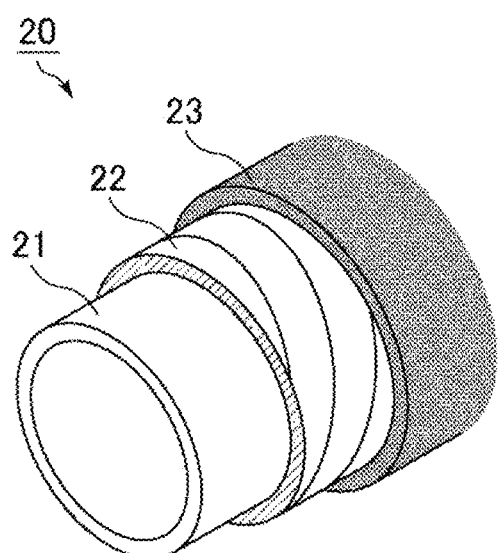
FIG. 5 is a schematic view of another example of the structure of the pipe.

The pipe of the present disclosure preferably further includes a third layer disposed on the second layer. Examples of the material that can be used for the third layer include metal, resin, and rubber. Preferred among these is metal. The third layer can be formed by covering the outer surface of the second layer with a necessary material by a known method, for example. FIG. 5 is a schematic view of an example of the structure of the pipe of this embodiment. A pipe 20 includes a first layer 21, a second layer 22, and a third layer 23 (reinforcing layer) laminated in the given order from the inner layer side.

The pipe of the present disclosure may optionally include an additional layer disposed on the outer surface of the third layer and/or an additional layer disposed on the inner surface of the first layer, depending on the application.

The tape and pipe of the present disclosure can be suitably used for riser tubes and flowlines. The riser tube and the flowline can suitably be used as a riser tube and a flowline for transporting a material from the sea floor to the surface of the sea in an offshore oil field or a gas field. Examples of the material include fluids such as crude oil, petroleum gas, and natural gas.

In addition to the riser tube and the flowline, the fiber-reinforced composite material or tape of the present disclosure may be applied to other applications, and may suitably be used as a fiber-reinforced composite material or tape for forming friction-resistant layers of metal pipes for transporting fluids such as crude oil and natural gas whether in the ground, on the ground, or on the sea floor, for example. Crude oil and natural gas contain carbon dioxide and hydrogen sulfide which cause corrosion of metal pipes. The fiber-reinforced composite material or tape of the present disclosure can block them to inhibit corrosion of metal pipes or to reduce the fluid friction due to highly viscous crude oil. In order to bond the fiber-reinforced composite material or tape to metal, adhesive may be used or the metal surface may be roughened. The fiber-reinforced composite material or tape of the present disclosure exhibits characteristics suitable as seals, bellows, diaphragms, hoses, tubes, and electric wires, such as gaskets and non-contact or contact packings (self-seal packings, piston rings, split ring packings, mechanical seals, and oil seals) requiring heat resistance, oil resistance, fuel oil resistance, LLC resistance, and steam resistance for high-temperature parts around automobile engines or portions requiring chemical resistance, such as engine bodies, main drive systems, valve train systems, lubrication and cooling systems, fuel systems, and intake and exhaust systems of automobile engines; transmission systems of driveline systems; steering systems of chassis; braking systems; and basic electrical parts, electrical parts of control systems, electrical accessories, and the like of electrical components. In addition to the automobile-related uses, the fiber-reinforced composite material or tape of the present disclosure is suitable for applications such as oil-, chemical-, heat-, steam-, or weather-resistant packings, O-rings, hoses, other sealing materials, diaphragms, and valves in transports such as shipping and aircraft; similar packings, O-rings, sealing materials, diaphragms, valves, hoses, rolls, tubes, chemical-resistant coatings, and linings used in chemical plants; similar packings, O-rings, hoses, sealing materials, belts, diaphragms, valves, rolls, and tubes used in food plant equipment and food machinery (including household items); similar packings, O-rings, hoses, sealing materials, diaphragms, valves, and tubes used in equipment for nuclear power plants; and similar packings, O-rings, hoses, sealing materials, diaphragms, valves, rolls, tubes, linings, mandrels, electric wires, flexible joints, belts, rubber plates, weather strips, and roll blades for plain paper copiers used in general industrial parts. The fiber-reinforced composite material or tape of the present disclosure exhibits chemical resistance, low elution, and less flavor permeation, and thus can be applied to uses such as oil-, chemical-, heat-, steam-, or weather-resistant sealing materials, cap materials, belts, rolls, hoses, tubes, films, coatings, linings, joints, and containers in the medical and chemical fields.

The laminate of the present disclosure may also be applied to pipes. In this case, pipes formed from the laminate can be produced by a typical method without any limitation. The pipes include corrugated tubes.

The fiber-reinforced composite material or tape of the present disclosure has excellent properties such as mechanical properties, heat resistance, oil resistance, amine resistance, and chemical resistance, and thus may be used as various parts in various fields such as the automobile industry, the aircraft industry, and the semiconductor industry.

Examples of the fields for use include a semiconductor-related field, an automobile field, an aircraft field, a space/rocket field, a ship field, a chemical product field such as chemical plants, a pharmaceutical field such as drugs, a photography field such as developing machines, a printing field such as printing machines, a painting field such as painting equipment, an analytical/physicochemical machinery field such as analytical instruments and measurement instruments, a food equipment field including food plant equipment and household products, a beverage and food manufacturing apparatus field, a drug manufacturing apparatus field, a medical component field, a chemical-reagent transport equipment field, a nuclear power plant equipment field, a steel field such as steel plate processing equipment, a general industrial field, an electrical field, a fuel cell field, an electronic component field, an optical equipment component field, a space equipment component field, a petrochemical plant equipment field, an energy resource searching and mining equipment component field for oil, gas, and the like, a petroleum refining field, and a petroleum transport equipment component field.

Examples of the usage of the fiber-reinforced composite material or tape of the present disclosure include various sealing materials and packings, such as rings, packings, gaskets, diaphragms, oil seals, bearing seals, lip seals, plunger seals, door seals, lip and face seals, gas delivery plate seals, wafer support seals, and barrel seals. The sealing material can be used in applications where heat resistance, solvent resistance, chemical resistance, and non-stickiness are required.

Also, possible usage include a tube, a hose, a roll, various types of rubber roll, a flexible joint, a rubber plate, a coating, a belt, a damper, a valve, a valve seat, a valve body, a chemical resistant coating material, a laminating material, a lining material, a pump impeller, a casing material, and the like.

The cross-sectional shape of the ring, packing, and seal may be any of various shapes, and, specifically, it may be, for example, a square shape, an O-shape, or a ferrule, or may be an irregular shape such as a D-shape, an L-shape, a T-shape, a V-shape, an X-shape, or a Y-shape.

In the semiconductor-related field, possible usage include, for example, a semiconductor manufacturing apparatus, a liquid crystal panel manufacturing apparatus, a plasma panel manufacturing apparatus, a plasma display panel manufacturing apparatus, a plasma-addressed liquid crystal panel manufacturing apparatus, an organic EL panel manufacturing apparatus, a field emission display panel manufacturing apparatus, a solar cell substrate manufacturing apparatus, and a semiconductor transport apparatus. Examples of such apparatuses include a CVD apparatus, a gas control apparatus such as a semiconductor gas control apparatus, a dry etching apparatus, a wet etching apparatus, a plasma etching apparatus, a reactive ion etching apparatus, a reactive ion beam etching apparatus, a sputter etching apparatus, an ion beam etching apparatus, an oxidation diffusion apparatus, a sputtering apparatus, an ashing apparatus, a plasma ashing apparatus, a cleaning apparatus, an ion injection apparatus, a plasma CVD apparatus, a ventilation apparatus, an exposure apparatus, a polishing apparatus, a film forming apparatus, a dry etching cleaning apparatus, a $UV/O_3$ cleaning apparatus, an ion beam cleaning apparatus, a laser beam cleaning apparatus, a plasma cleaning apparatus, a gas etching cleaning apparatus, an extraction cleaning apparatus, a Soxhlet extraction cleaning apparatus, a high temperature high pressure extraction cleaning apparatus, a microwave extraction cleaning apparatus, a supercritical extraction cleaning apparatus, a cleaning apparatus involving hydrofluoric acid, hydrochloric acid, sulfuric acid, ozone water, or the like, a stepper, a coater/developer, a CMP apparatus, an excimer laser exposure machine, chemical solution piping, gas piping, an apparatus for carrying out plasma treatment such as $NF_3$ plasma treatment, $O_2$ plasma treatment, and fluorine plasma treatment, a heat treatment film forming apparatus, a wafer transport apparatus, a wafer cleaning apparatus, a silicon wafer cleaning apparatus, a silicon wafer treatment apparatus, an apparatus used in LP-CVD process, an apparatus used in lamp annealing process, and an apparatus used in reflow process.

Specific examples of usage in the semiconductor-related field include various sealing materials such as an O-ring and a gasket for a gate valve, a quartz window, a chamber, a chamber lid, a gate, a bell jar, a coupling, and a pump; various sealing materials such as an O-ring for a resist developer and stripper, a hose, and a tube; a lining and a coating for a resist developer tank, a stripper tank, a wafer cleaning solution tank, a turntable, a chuck pin, and a wet etching tank; a diaphragm for a pump; a roll for wafer transport; a hose and a tube for a wafer cleaning solution; a sealing material for a clean facility, such as a sealant for a clean facility such as a clean room; a sealing material for a storage room for storing semiconductor manufacturing apparatuses and devices such as wafers; and a diaphragm for transferring a chemical solution used in a semiconductor manufacturing process.

In the automobile field, possible usage include an engine body, a main motor system, a valve train system, a lubrication/cooling system, a fuel system, an intake/exhaust system, a transmission system of a drive system, a steering system of a chassis, a brake system, and an electrical component such as a basic electrical component, a control system electrical component, and an equipment electrical component. The automobile field also includes motorcycles.

As for the engine body and its peripherals described above, the tape of the present disclosure can be used for various sealing materials that are required to have heat resistance, oil resistance, fuel oil resistance, engine cooling antifreeze resistance, and steam resistance, and examples of such sealing materials include seals such as gaskets, shaft seals, and valve stem seals, non-contact or contact type packings such as self-seal packings, piston rings, split-ring packings, mechanical seals and oil seals, bellows, diaphragms, hoses, tubes, and various sealing materials used for electric wires, cushioning materials, anti-vibration materials, and belt AT apparatuses.

Specific examples of usage in the fuel system include an O-ring used for a fuel injector, a cold start injector, a fuel line quick connector, a sender flange quick connector, a fuel pump, a fuel tank quick connector, a gasoline mixing pump, a gasoline pump, a tube body of a fuel tube, a connector of a fuel tube, an injector, and the like; a seal used for an intake manifold, a fuel filter, a pressure regulating valve, a canister, a fuel tank cap, a fuel pump, a fuel tank, a fuel tank sender unit, a fuel injection apparatus, a fuel high pressure pump, a fuel line connector system, a pump timing control valve, a suction control valve, a solenoid sub-assembly, a fuel cut valve, and the like; a canister purge solenoid valve seal, an onboard refueling vapor recovery (ORVR) valve seal, a fuel pump oil seal, a fuel sender seal, a fuel tank rollover valve seal, a filler seal, an injector seal, a filler cap seal, and a filler cap valve seal; a hose such as a fuel hose, a fuel supply hose, a fuel return hose, a vapor (evaporation) hose, a vent (breather) hose, a filler hose, a filler neck hose, a hose in a fuel tank (in-tank hose), a carburetor control hose, a fuel inlet hose, and a fuel breather hose; a gasket used for a fuel filter, a fuel line connector system, and the like, and a flange gasket used for a carburetor and the like; a line material for a steam recovery line, a fuel feed line, a vapor/ORVR line, and the like; a diaphragm used for a canister, an ORVR, a fuel pump, a fuel tank pressure sensor, a gasoline pump, a carburetor sensor, a composite air controller (CAC), a pulsation damper, a canister, an autocock, and the like, and a pressure regulator diaphragm of a fuel injector; a fuel pump valve, a carburetor needle valve, a rollover check valve, and a check valve; a tube used in a vent (breather) and a fuel tank; a tank packing for a fuel tank or the like, and a packing for a carburetor acceleration pump piston; a fuel sender anti-vibration component for a fuel tank; an O-ring and a diaphragm for controlling a fuel pressure; an accelerator pump cup; an in-tank fuel pump mount; an injector cushion ring of a fuel injector; an injector seal ring; a needle valve core valve of a carburetor; an acceleration pump piston of a carburetor; a valve seat of a compound air controller (CAC); a fuel tank body; and a seal component for a solenoid valve.

Specific examples of usage in the brake system include a diaphragm used for a master back, a hydraulic brake hose air brake, a brake chamber of an air brake, and the like; a hose used for a brake hose, a brake oil hose, a vacuum brake hose, and the like; various sealing materials such as an oil seal, an O-ring, a packing, and a brake piston seal; a breather valve and a vacuum valve for a master back and a check valve for a brake valve; a piston cup (rubber cup) for a master cylinder, and a brake cup; and a boot for a master cylinder and a vacuum booster of a hydraulic brake, and a wheel cylinder of a hydraulic brake, and an O-ring and a grommet for an anti-lock brake system (ABS).

Specific examples of usage in the basic electrical component include an insulator and a sheath of an electric wire (harness), a tube of a harness exterior component, and a grommet for a connector. Specific examples of usage in the control system electrical component include a covering material of various sensor wires.

Specific examples of usage in the equipment electrical component include an O-ring and a packing for a car air conditioner, a gasket for a cooler hose, a high pressure air conditioner hose, and an air conditioner hose, a gasket for an electronic throttle unit, a plug boot for direct ignition, and a diaphragm for a distributor. Also, possible usage include bonding an electrical component.

Specific examples of usage in the intake/exhaust system include a packing used for an intake manifold, an exhaust manifold, and the like, and a throttle body packing for a throttle; a diaphragm used for EGR (exhaust gas recirculation), pressing control (BPT), a wastegate, a turbo wastegate, an actuator, an actuator for a variable turbine geometry (VTG) turbo, an exhaust purification valve, and the like; a hose such as an EGR (exhaust gas recirculation) control hose, an emission control hose, a turbo oil hose (supply) and a turbo oil hose (return) of a turbocharger, a turbo air hose, an intercooler hose, a turbocharger hose, a hose connected to a compressor of a turbo engine equipped with an intercooler, an exhaust gas hose, an air intake hose, a turbo hose, and a DPF (diesel particulate filter) sensor hose; an air duct and a turbo air duct; an intake manifold gasket; and a sealing material EGR, a sealing material used for an afterburn prevention valve seat of an AB valve, a turbine shaft seal (of a turbocharger and the like), and a groove component of a rocker cover and air suction manifold and the like used in automobile engines.

In addition, in exhaust gas control components, possible usage include a seal used for a steam recovery canister, a catalytic converter, an exhaust gas sensor, an oxygen sensor, and the like, and a seal for a solenoid armature of steam recovery and steam canister; and an intake manifold gasket.

In addition, in components relating to diesel engines, possible usage include an O-ring seal for a direct injection injector, a rotary pump seal, a control diaphragm, a fuel hose, a diaphragm for EGR, a priming pump, and a boost compensator, and the like. It can also be used as an O-ring, a sealing material, a hose, a tube, and a diaphragm used for a urea SCR system, a sealing material for a urea water tank body and a urea water tank of a urea SCR system, and the like.

Specific examples of usage in the transmission system include a transmission-related bearing seal, oil seal, O-ring, packing, and torque converter hose.

Examples also include a transmission oil seal, and a transmission oil hose, an ATF hose, an O-ring, and a packing of an AT.

The transmission includes an AT (automatic transmission), an MT (manual transmission), a CVT (continuously variable transmission), a DCT (dual clutch transmission), and the like.

Examples also include an oil seal, a gasket, an O-ring, and a packing for a manual or automatic transmission, an oil seal, a gasket, an O-ring, and a packing for a continuously variable transmission (a belt type or a toroidal type), a packing for an ATF linear solenoid, an oil hose for a manual transmission, an ATF hose for an automatic transmission, and a CVTF hose for a continuously variable transmission (a belt type or a toroidal type).

Specific examples of usage in the steering system include a power steering oil hose and a high pressure power steering hose.

Examples of usage in the engine body of an automobile engine include gaskets such as a cylinder head gasket, a cylinder head cover gasket, an oil pan packing, and a general-purpose gasket, seals such as an O-ring, a packing, and a timing belt cover gasket, hoses such as a control hose, anti-vibration rubber of an engine mount, a control valve diaphragm, and a camshaft oil seal. In the main motor system of an automobile engine, possible usage include a shaft seal such as a crankshaft seal and a camshaft seal, and the like.

In the valve train system of an automobile engine, possible usage include a valve stem oil seal of an engine valve, a valve seat of a butterfly valve, and the like.

In the lubrication/cooling system of an automobile engine, possible usage include an engine oil cooler hose, an oil return hose, and a seal gasket of an engine oil cooler, a water hose around a radiator, a radiator seal, a radiator gasket, a radiator O-ring, a vacuum pump oil hose of a vacuum pump, a radiator hose, a radiator tank, a diaphragm for oil pressure, a fan coupling seal, and the like.

Thus, specific examples of usage in the automobile field include an engine head gasket, an oil pan gasket, a manifold packing, an oxygen sensor seal, an oxygen sensor bush, a nitrogen oxide ($NO_x$) sensor seal, a nitrogen oxide ($NO_x$) sensor bush, a sulfur oxide sensor seal, a temperature sensor seal, a temperature sensor bush, a diesel particle filter sensor seal, a diesel particle filter sensor bush, an injector O-ring, an injector packing, a fuel pump O-ring and diaphragm, a gearbox seal, a power piston packing, a cylinder liner seal, a valve stem seal, a static valve stem seal, a dynamic valve stem seal, an automatic transmission front pump seal, a rear axle pinion seal, a universal joint gasket, a speedometer pinion seal, a foot brake piston cup, a torque transmission apparatus O-ring and oil seal, a discharge gas afterburner seal and bearing seal, an afterburner hose, a carburetor sensor diaphragm, an anti-vibration rubber (such as an engine mount, an exhaust part, a muffler hanger, a suspension bush, a center bearing, and a strut bumper rubber), a suspension anti-vibration rubber (such as a strut mount and a bush), a drive system anti-vibration rubber (such as a damper), a fuel hose, an EGR tube and hose, a twin cab tube, a carburetor needle valve core valve, a carburetor flange gasket, an oil hose, an oil cooler hose, an ATF hose, a cylinder head gasket, a water pump seal, a gearbox seal, a needle valve tip, a motorcycle reed valve reed, an automobile engine oil seal, a gasoline hose gun seal, a car air conditioner seal, an engine intercooler rubber hose, a seal of fuel line connector systems, a CAC valve, a needle tip, an electric wire around an engine, a filler hose, a car air conditioner O-ring, an intake gasket, a fuel tank material, a distributor diaphragm, a water hose, a clutch hose, a PS hose, an AT hose, a master back hose, a heater hose, an air conditioner hose, a ventilation hose, an oil filler cap, a PS rack seal, a rack & pinion boot, a CVJ boot, a ball joint dust cover, a strut dust cover, a weather strip, a glass run, a center unit packing, a body sight welt, a bumper rubber, a door latch, a dash insulator, a high tension cord, a flat belt, a poly V belt, a timing belt, a toothed belt, a V-ribbed belt, a tire, a wiper blade, a diaphragm and a plunger for an LPG vehicle regulator, a diaphragm and a valve for a CNG vehicle regulator, a DME compatible rubber component, an auto tensioner diaphragm and boot, an idle speed control diaphragm and valve, an auto speed control actuator, a negative pressure pump diaphragm, check valve and plunger, an O.P.S. diaphragm and O-ring, a gasoline pressure relief valve, an engine cylinder sleeve O-ring and gasket, a wet cylinder sleeve O-ring and gasket, a differential gear seal and gasket (gear oil seal and gasket), a power steering apparatus seal and gasket (PSF seal and gasket), a shock absorber seal and gasket (SAF seal and gasket), a constant velocity joint seal and gasket, a wheel bearing seal and gasket, a metal gasket coating agent, a caliper seal, a boot, a wheel bearing seal, and a bladder used in vulcanization molding of a tire.

In the aircraft field, the space/rocket field, and the ship field, possible usage include especially a fuel system and a lubricating oil system.

In the aircraft field, possible usage include, for example, various aircraft sealing components, various aircraft components in aircraft engine oil applications, a jet engine valve stem seal, gasket, and O-ring, a rotating shaft seal, a hydraulic equipment gasket, a fire wall seal, a fuel supply hose, gasket, and O-ring, an aircraft cable, oil seal, and shaft seal, and the like.

In the space/rocket field, possible usage include, for example, a lip seal, a diaphragm, and an O-ring for a spacecraft, a jet engine, a missile, and the like, a gas turbine engine oil-resistant O-ring, a vibration isolation table pad for missile ground control, and the like.

In the ship field, possible usage include, for example, a screw propeller shaft stern seal, a diesel engine intake/exhaust valve stem seal, a valve seal of a butterfly valve, a valve seat and a shaft seal of a butterfly valve, a shaft seal of a butterfly valve, a stern tube seal, a fuel hose, a gasket, an engine O-ring, a ship cable, a ship oil seal, a ship shaft seal, and the like.

In the chemical product field such as chemical plants and the pharmaceutical field such as drugs, possible usage include a process where a high level of chemical resistance is required, such as a process of producing chemical products such as drugs, agrochemicals, coating materials, and resins.

Specific examples of usage in the chemical product and pharmaceutical fields include seals used in a chemical apparatus, a pump and a flow meter for chemical reagents, piping for chemical reagents, a heat exchanger, an agrochemical sprayer, an agrochemical transfer pump, gas piping, a fuel cell, an analytical instrument and physicochemical instrument (such as column fitting for analytical instruments and measurement instruments), an expansion joint of a flue gas desulfurization apparatus, a nitric acid plant, a power plant turbine, and the like, a seal used in a medical sterilization process, a seal for a plating solution, a belt roller seal for paper making, a wind tunnel joint seal; an O-ring used in a chemical apparatus such as a reactor and a stirrer, an analytical instrument and measurement instrument, a chemical pump, a pump housing, a valve, a rotary meter, and the like, an O-ring for a mechanical seal, and an O-ring for compressor sealing; a packing used in a tube joint part or the like of a high temperature vacuum dryer, a gas chromatography, and a pH meter, and a glass cooler packing for a sulfuric acid manufacturing apparatus; a diaphragm used in a diaphragm pump, an analytical instrument, a physicochemical instrument, and the like; a gasket used in an analytical instrument and a measurement instrument; a fitting wheel (ferrule) used in an analytical instrument and a measurement instrument; a valve seat; a U cup; a lining used in a chemical apparatus, a gasoline tank, a wind tunnel, and the like, and a corrosion-resistant lining for an anodized aluminum processing tank; a coating of a masking jig for plating; a valve component of an analytical instrument and a physicochemical instrument; an expansion joint of a flue gas desulfurization plant; an acid resistant hose against concentrated sulfuric acid and the like, a chlorine gas transfer hose, an oil-resistant hose, a rainwater drain hose for benzene and toluene storage tanks; a chemical resistant tube and a medical tube used in an analytical instrument and a physicochemical instrument; a trichlorethylene-resistant roll for fiber dyeing and a dyeing roll; a medical plug for drug; a medical rubber plug; a chemical solution bottle, a chemical solution tank, a bag, a chemical container; and protective equipment such as a glove and a boot that are resistant to strong acids and solvents.

In the photography field such as a developing machine, the printing field such as a printing machine, and the painting field such as painting equipment, possible usage include a roll, a belt, a seal, a valve component, and the like of a dry copier.

Specific examples of usage in the photography field, the printing field, and the painting field include a surface layer of a transfer roll of a copier, a cleaning blade of a copier, and a copier belt; a roll (such as a fixing roll, a crimping roll, and a pressure roll) and a belt for OA equipment such as a copier, a printer, and a facsimile; a roll, a roll blade, and a belt of a PPC copier; a roll of a film developer and an X-ray film developer; a printing roll, a scraper, a tube, a valve component, and a belt for a printing machine; an ink tube, a roll, and a belt of a printer; a coating roll, a scraper, a tube, and a valve component of coating and painting equipment; and a development roll, a gravure roll, a guide roll, a guide roll for a magnetic tape manufacturing coating line, a gravure roll for a magnetic tape manufacturing coating line, a coating roll, and the like.

In the food plant equipment and the food equipment field including household products, possible usage include a food manufacturing process and for food transfer equipment or food storage equipment.

Specific examples of usage in the food equipment field include a seal for a plate-type heat exchanger, a solenoid valve seal for an automatic vending machine, a jar pot packing, a sanitary pipe packing, a pressure cooker packing, a water heater seal, a heat exchanger gasket, a diaphragm and a packing for a food processing treatment apparatus, and a rubber material for a food processing treatment machine (e.g., various seals such as a heat exchanger gasket, a diaphragm, and an O-ring, piping, a hose, a sanitary packing, a valve packing, and a filling packing used as a joint between the mouth of a bottle or the like and a filler during filling). Examples also include a packing, a gasket, a tube, a diaphragm, a hose, and a joint sleeve used for products such as alcoholic beverages and soft drinks, a filling apparatus, a food sterilizer, a brewing apparatus, a water heater, and various automatic food vending machines.

In the nuclear power plant equipment field, possible usage include a check valve and a pressure reducing valve around a nuclear reactor, a seal for a uranium hexafluoride enricher, and the like.

Specific examples of usage in the general industrial field include a sealing material for hydraulic equipment such as a machine tool, a construction machine, and a hydraulic machine; a seal and a bearing seal of a hydraulic and lubrication machine; a sealing material used for a mandrel and the like; a seal used for a window of a dry cleaner and the like; a seal and a (vacuum) valve seal for a cyclotron, a proton accelerator seal, a seal for an automatic packaging machine, a diaphragm of a pump for an analyzer of sulfur dioxide gas and chlorine gas in air (pollution measuring equipment), a snake pump lining, a roll and a belt for a printer, a transport belt (a conveyor belt), a squeezing roll for acid-washing of an iron plate and the like, a robot cable, a solvent squeezing roll for aluminum rolling line and the like, a coupler O-ring, an acid resistant cushioning material, a dust seal and a lip rubber for a sliding part of a cutting machine, a gasket for garbage incinerator, a friction material, a metal or rubber surface modifier, and a covering material. Also, possible usage include a gasket and a sealing material for an apparatus used in a papermaking process, a sealant for a clean room filter unit, an architectural sealant, a protective coating agent for concrete, cement, and the like, a glass cloth impregnating material, a polyolefin processing aid, a polyethylene formability improving additive, a fuel tank for a small generator, a lawnmower, and the like, and a pre-coated metal obtained by applying a primer treatment to a metal plate. In addition, possible usage include a sheet and a belt by impregnating a woven fabric therewith and baking it.

Specific examples of usage in the steel field include an iron plate processing roll for iron plate processing equipment.

Specific examples of usage in the electrical field include an insulating oil cap for the Shinkansen bullet train, a benching seal for a liquid-sealed transformer, a transformer seal, an oil well cable jacket, a seal for an oven such as an electric furnace, a window frame seal for a microwave oven, a sealing material used when bonding a wedge and a neck of CRT, a sealing material for a halogen lamp, a fixing agent for an electrical component, a sealing material for end treatment of a sheathed heater, and a sealing material used as an insulation and moisture proof treatment of a lead wire terminal of electrical equipment. Also, possible usage include a covering material of an oil resistant/heat resistant electric wire, a highly heat resistant wire, a chemical resistant wire, a highly insulated wire, a high voltage transmission line, a cable, an electric wire used in a geothermal power generation apparatus, an electric wire used around an automobile engine, and the like. Also, possible usage include an oil seal and a shaft seal of a vehicle cable. Moreover, possible usage also include an electrical insulation material (such as a material used as an insulation spacer of various electric apparatuses, an insulation tape used in a joint, a terminal part, and the like of a cable, and a heat-shrinkable tube), and an electric and electronic apparatus materials used in a high temperature atmosphere (such as a lead wire material for a motor and a wire material around a high temperature furnace). Also, possible usage include a sealing layer and a protective film (a back sheet) of a solar cell.

In the fuel cell field, possible usage include a sealing material between electrodes or between an electrode and a separator, a seal, a packing, a separator, and the like of a pipe for hydrogen, oxygen, generated water, and the like in solid polymer fuel cells, phosphate fuel cells, and the like.

In the electronic component field, possible usage include a heat dissipation material raw material, an electromagnetic wave shielding material raw material, a gasket for a computer hard disk drive (magnetic recorder), and the like. Also, possible usage include a cushioning rubber (a crash stopper) for a hard disk drive, a binder for an electrode active material of a nickel-metal hydride secondary battery, a binder for an active material of a lithium-ion battery, a polymer electrolyte for a lithium secondary battery, a binder for the positive electrode of an alkaline rechargeable battery, a binder for an EL element (an electroluminescence element), a binder for the electrode active material of a capacitor, an encapsulating agent, a sealant, a film and a sheet for a covering material for the quartz of an optical fiber, an optical fiber covering material, and the like, a potting, a coating, and an adhesive seal for electronic components and circuit boards, a fixing agent for an electronic component, a modifying agent for an encapsulating agent such as epoxy, a coating agent for a printed circuit board, a modifying agent for a printed wiring board prepreg resin such as epoxy, an anti-scattering material for a light bulb and the like, a gasket for a computer, a cooling hose for a large computer, a packing such as a gasket or an O-ring for a secondary battery and especially a lithium secondary battery, a sealing layer for covering one or both outer surfaces of an organic EL structure, a connector, and a damper.

In the chemical reagent transport equipment field, possible usage include a safety valve and a shipping valve for trucks, trailers, tank trucks, ships, and the like.

In the energy resource searching and mining equipment component field for oil, gas, and the like, possible usage include various sealing materials used when mining oil, natural gas, and the like, an electric connector boot used in oil wells, and the like.

Specific examples of usage in the energy resource search and mining equipment component field include a drill bit seal, a pressure regulating diaphragm, a horizontal drilling motor (stator) seal, a stator bearing (shaft) seal, a sealing material used in a blowout prevention apparatus (BOP), a sealing material used in a rotary blowout prevention apparatus (pipe wiper), a sealing material and a gas-liquid connector used in MWD (real-time drilling information detection system), a logging tool seal used in a logging equipment (such as an O-ring, a seal, a packing, a gas-liquid connector, and a boot), an inflatable packer and a completion packer and a packer seal used therein, a seal and a packing used in a cementing apparatus, a seal used in a perforator, a seal and a packing and a motor lining used in a mud pump, an underground auditory detector cover, a U-cup, a composition seating cup, a rotating seal, a laminated elastomeric bearing, a flow control seal, a sand volume control seal, a safety valve seal, a seal of a hydraulic fracturing equipment, a seal and a packing for a linear packer and a linear hanger, a wellhead seal and packing, a seal and a packing for a chalk and a valve, a sealing material for LWD (logging while excavation), a diaphragm used in oil exploration and oil drilling applications (such as a diaphragm for supplying lubricating oil to oil drilling pits), and a seal element for gate valves, electronic boots, and perforation guns.

In addition, possible usage include a joint seal for a kitchen, a bathroom, a washroom, and the like; a ground sheet of an outdoor tent; a seal for a stamp material; a rubber hose for a gas heat pump and a Freon-resistant rubber hose; an agricultural film, lining, and weather resistance cover; a tank of a laminated steel sheet or the like used in the fields of construction and household electric appliances, and the like.

Moreover, possible usage also include an article combined with a metal such as aluminum. Examples of such usage include a door seal, a gate valve, a pendulum valve, a solenoid tip, and also a piston seal and a diaphragm combined with a metal, a metal rubber component combined with a metal, such as a metal gasket.

Also, possible usage include a rubber component, a brake shoe, a brake pad, and the like of bicycles.

One form of the fiber-reinforced composite material or tape of the present disclosure is a belt. Examples of the belt are as follows: a power transmission belt (including a flat belt, a V-belt, a V-ribbed belt, a toothed belt, and the like), a flat belt used as a transport belt (a conveyor belt) at various high-temperature sites, e.g., around an engine of agricultural machinery, a machine tool, industrial machinery, and the like; a conveyor belt for transporting bulk and particulate materials such as coal, crushed stone, earth and sand, ore, wood chips, and the like in a high temperature environment; a conveyor belt used in a steel mill such as a blast furnace; a conveyor belt in applications exposed to a high temperature environment in precision equipment assembly plants, food factories, and the like; a V-belt and a V-ribbed belt for agricultural machinery, general equipment (such as OA equipment, printing machines, and commercial dryers), automobiles, and the like; a transmission belt for a transfer robot; a toothed belt such as a transmission belt for food machines and machine tools; and a toothed belt used in an automobile, OA equipment, medical equipment, a printing machine, and the like.

In particular, a timing belt is a representative example of a toothed belt for automobiles.

The belt may have a single-layer structure or a multi-layer structure.

In the case of a multi-layer structure, the belt may be composed of fiber-reinforced composite material or tape of the present disclosure and a layer made of another material.

In a belt having a multi-layer structure, examples of the layer made of another material include a layer made of another rubber, a layer made of a thermoplastic resin, various fiber-reinforced layers, canvas, and a metal foil layer.

The fiber-reinforced composite material or tape of the present disclosure can also be used as an industrial anti-vibration pad, an anti-vibration mat, a railway slab mat, a pad, an automobile anti-vibration rubber, and the like.

Examples of the automobile anti-vibration rubber include anti-vibration rubbers for an engine mount, a motor mount, a member mount, a strut mount, a bush, a damper, a muffler hanger, a center bearing, and the like.

Examples of another usage include a joint member for a flexible joint, an expansion joint, and the like, a boot, and a grommet. In the ship field, examples include marine pumps.

The joint member refers to a joint used in piping and piping equipment, and used in applications for preventing vibration and noise produced from the piping system, absorbing expansion, contraction and displacement resulting from a temperature change and a pressure change, absorbing a dimensional change, mitigating and preventing the influences of earthquakes and land subsidence, and the like.

The flexible joint and the expansion joint can be preferably used as complex-shape formed article for, for example, shipbuilding piping, for mechanical piping of a pump, a compressor, and the like, for chemical plant piping, for electrical piping, for civil engineering and water piping, and for automobiles.

The boot can be preferably used as a complex-shape formed article for various industrial boots, e.g., a boot for an automobile such as a constant velocity joint boot, a dust cover, a rack and pinion steering boot, a pin boot, and a piston boot, a boot for agricultural machinery, a boot for an industrial vehicle, a boot for construction machinery, a boot for hydraulic machinery, a boot for pneumatic machinery, a boot for a centralized lubricator, a boot for liquid transfer, a boot for fire extinguishing, and a boot for transferring various types of liquefied gas.

Also, possible usage include a diaphragm for a filter press, a diaphragm for a blower, a diaphragm for supplying water, a diaphragm for a liquid storage tank, a diaphragm for a pressure switch, a diaphragm for an accumulator, a diaphragm for an air spring such as a suspension, and the like.

Also, possible usage include, for example, a cushioning material for hot press molding when producing decorative plywood, a printed circuit board, an electrical insulation board, and a rigid polyvinyl chloride laminate made of melamine resin, phenol resin, epoxy resin, or the like.

In addition, contribution to impermeability of various supports such as weapon-related sealing gaskets and protective clothes against contact with invasive chemicals is also possible.

Also, possible usage include an O (square)-ring, a V-ring, an X-ring, a packing, a gasket, a diaphragm, an oil seal, a bearing seal, a lip seal, a plunger seal, a door seal, a lip and face seal, a gas delivery plate seal, a wafer support seal, a barrel seal, and other various sealing materials used for sealing lubricating oil (such as engine oil, transmission oil, and gear oil) containing amine-type additives (in particular, amine-type additives used as antioxidants and detergent dispersants) used in transportation systems such as automobiles and ships, and fuel oil and grease (in particular, urea-based grease), and can also be used as a tube, a hose, various rubber rolls, a coating, a belt, a valve body of a valve, and the like. Also, possible usage include a laminating material and a lining material.

Also, possible usage include a covering material for a heat-resistant, oil-resistant electric wire used as a lead wire of a sensor that comes into contact with transmission oil and/or engine oil of an internal combustion engine of an automobile and the like and that detects the oil temperature and/or the oil pressure, and in a high-temperature oil atmosphere inside an oil pan or the like of an automatic transmission or an engine.

Other examples include applications such as a non-stick oil resistant roll for a copier, a weather strip for preventing weathering and freezing, an infusion rubber stopper, a vial rubber stopper, a mold release agent, a non-stick lightweight transport belt, an adhesion preventing coating on a play gasket of an automobile engine mount, a synthetic fiber coating processing, a bolt member or a joint having thin packing-coated layer, and the like.

The automobile-related component applications of the fiber-reinforced composite material or tape of the present disclosure also include an application as components of motorcycles having the same structure.

Examples of automobile-related fuel include light oil, gasoline, and fuel for diesel engines (including biodiesel fuel).

The use of a fiber-reinforced composite material, tape, laminate, pipe, riser pipe or flow line in a high-temperature environment is also part of the present disclosure.

While embodiments have been described above, it will be understood that various changes in form and detail can be made without departing from the gist and scope of the claims.

According to the present disclosure, there is provided a fiber-reinforced composite material comprising a carbon fiber and a fluororesin, and having a tensile elasticity measured under the following conditions of 40 GPa or more.
(Measurement Conditions of Tensile Elasticity)

The measurement is carried out in accordance with ASTM D3039-17 except that the following conditions are adopted:

clip: manufactured by Instron Corporation, model 2580-301, capacity±100 kN;

strain gauge: manufactured by Tokyo Measuring Instruments Laboratory Co., Ltd., model: FLA-6-11-3LJCT; and tensile rate: 2 mm/min.

In the fiber-reinforced composite material of the present disclosure, the fluororesin preferably contains chlorine atom.

In the fiber-reinforced composite material of the present disclosure, the fluororesin preferably has a chlorine atom content of 1.5% by mass or more.

In the fiber-reinforced composite material of the present disclosure, the fluororesin is preferably at least one selected from the group consisting of a polychlorotrifluoroethylene and a chlorotrifluoroethylene copolymer.

In the fiber-reinforced composite material of the present disclosure, it is preferable that the carbon fiber includes a carbon monofilament and a sizing agent adhered to the carbon monofilament, and an amount of the sizing agent adhered is 3% or less based on a total mass of the carbon monofilament and the sizing agent.

The fiber-reinforced composite material of the present disclosure preferably has a maximum point stress of 600 MPa or more.

The fiber-reinforced composite material of the present disclosure is preferably a tape.

EXAMPLES

Next, embodiments of the present disclosure will now be described by way of Examples, but the present disclosure is not limited only to the Examples.

Various numerical values in the Examples were measured by the following methods.
<Composition of Fluororesin>

The composition of the fluororesin was determined by 19F-NMR measurement at a measurement temperature of (melting point of the polymer+20°) C. using a nuclear magnetic resonance device AC300 (Bruker-Biospin) with the integral values of the respective peaks, appropriately in combination with elemental analysis results depending on the types of the monomers.

<Chlorine Atom Content of Fluororesin>

The chlorine atom content of fluororesin was calculated from the composition of the fluororesin.

<Melting Point (° C.) of Fluororesin>

The melting point was determined from the peak on an endothermic curve obtained by thermal analysis at a temperature-increasing rate of 10° C./min using a differential scanning calorimeter RDC220 (Seiko Instruments Inc.) in accordance with ASTM D-4591.

<Flow Value of Fluororesin>

Using an up-and-down flow tester CFT-500D (manufactured by Shimadzu Corporation), the sample was extruded at a temperature of 230° C. and a load of 100 kgf through an orifice 1 mm in diameter by 1 mm in length, and the volume of resin flow per second (cm³/sec) was taken as the flow value.

<Melt Flow Rate (MFR) of Fluororesin>

The MFR was defined as the mass (g/10 min) of a polymer flowing out of a nozzle having an inner diameter of 2 mm and a length of 8 mm per 10 minutes at 297° C. or 230° C. and a load of 5 kg using a melt indexer (Toyo Seiki Seisaku-sho, Ltd.) in accordance with ASTM D3307-01.

Examples 1 to 2 and Comparative Examples 1 to 2

Films of the following fluororesins showed in Table 2 were prepared.

TABLE 2

| Type | | Chlorine atom content (% by mass) | Melting point (° C.) | Flow value (cm³/sec) (setting temperature) | MFR (g/10 minutes) (setting temperature) |
|---|---|---|---|---|---|
| Fluororesin (1) | PCTFE (CTFE = 100 (mol %)) | 30 | 212 | $2.0 \times 10^{-3}$ (230° C.) | — |
| Fluororesin (2) | Ethylene/TFE Copolymer | 0 | 255 | — | 6.0 (297° C.) |
| Fluororesin (3) | TFE/PPVE/CTFE copolymer (TFE/PPVE/CTFE = 77/3/20 (mol %)) | 6.5 | 248 | — | 30 (297° C.) |
| Fluororesin (4) | PVDF (VDF/CTFE = 97.4/2.6 (mol %)) | 1.4 | 172 | — | 3.5 (230° C.) |

Fluororesin (4)

Polyvinylidene fluoride (manufactured by Solvay, Solef 60512)

The fluororesin film, the carbon fiber sheet, and the fluororesin film were disposed in this order, and the mixing ratio (mass ratio) between the fluororesin and the carbon fibers was set to 40:60 to 45:55. A sheet-shaped fiber-reinforced composite material was obtained by performing heat-pressing under the following conditions. The thickness of the obtained sheet-shaped fiber-reinforced composite material was 0.24 mm.

Carbon Fiber

T700SC-12000-60E manufactured by Toray Industries, Inc. (tensile strength: 4,900 MPa, tensile elasticity: 230 GPa, amount of sizing agent adhered: 0.2%)

Heat-Press Conditions

Press temperature: 300° C.

Heat retention time: 5 minutes

Pressing time: 10 minutes

Pressure: 15 kN

A tensile test was performed in accordance with ASTM D638 to measure the maximum point stress, the maximum point elongation, and the tensile elasticity of the fluororesin film. The results are shown in Table 3.

A tensile test was conducted in accordance with ASTM D3039-17 under the following conditions, and the maximum point stress, the maximum point elongation, and the tensile elasticity of the obtained fiber-reinforced composite material were measured. The results are shown in Table 3.

Sample shape: thickness: 0.24 mm, width: 20 mm, length: 250 mm

Clip: manufactured by Instron Corporation, model 2580-301, capacity±100 kN

Strain gauge: manufactured by Tokyo Measuring Instruments Laboratory Co., Ltd., model: FLA-6-11-3LJCT Tensile rate: 2 mm/min Gauge length: 130 mm

TABLE 3

| | | Fiber-reinforced composite material | | | |
|---|---|---|---|---|---|
| Fluororesin | | Example 1 (1) | Comparative Example 1 (2) | Example 2 (3) | Comparative Example 2 (4) |
| Carbon fiber | | manufactured by Toray Industries, Inc. T700SC-12000-60E | manufactured by Toray Industries, Inc. T700SC-12000-60E | manufactured by Toray Industries, Inc. T700SC-12000-60E | manufactured by Toray Industries, Inc. T700SC-12000-60E |
| Maximum point stress | MPa | 1490 | 161 | 1180 | 88 |
| Maximum point elongation | % | 1.3 | 1.9 | 1.2 | 2.7 |
| Tensile elasticity | GPa | 108 | 11 | 107 | 6 |

| | | Fluororesin Film | | |
|---|---|---|---|---|
| Fluororesin | | (1) | (2) | (3) |
| Maximum point stress | MPa | 55 | 60 | 25 |
| Maximum point elongation | % | 450 | 435 | 390 |
| Tensile elasticity | GPa | 1.4 | 0.5 | 0.3 |

REFERENCE SIGNS LIST 1a, 1b, 1c: tape
2: center portion
3: thin portion
4: protrusion
5: thin portion
10: pipe
11: first layer
12: second layer
14, 15, 16: tape
20: pipe
21: first layer
22: second layer
23: third layer

What is claimed is:

1. A fiber-reinforced composite material comprising a carbon fiber and a fluororesin, and having a tensile elasticity measured under the following conditions of 40 GPa or more,
(measurement conditions of tensile elasticity)
the measurement is carried out in accordance with ASTM D3039-17 except that the following conditions are adopted:
clip: manufactured by Instron Corporation, model 2580-301, capacity±100 kN;
strain gauge: manufactured by Tokyo Measuring Instruments Laboratory Co., Ltd., model: FLA-6-11-3LJCT; and
tensile rate: 2 mm/min;
wherein the fluororesin is at least one selected from the group consisting of a polychlorotrifluoroethylene and a chlorotrifluoroethylene copolymer,
the fluororesin has a chlorine atom and a chlorine atom content of 4.0% by mass or more, and
a mass ratio of the fluororesin to the carbon fiber (fluororesin: carbon fiber) is 10:90 to 90:10.

2. The fiber-reinforced composite material according to claim 1, wherein the fluororesin has a chlorine atom content of 6.5% by mass or more.

3. The fiber-reinforced composite material according to claim 1, wherein the carbon fiber includes a carbon monofilament and a sizing agent adhered to the carbon monofilament, and an amount of the sizing agent adhered is 3% or less based on a total mass of the carbon monofilament and the sizing agent.

4. The fiber-reinforced composite material according to claim 1, having a maximum point stress of 600 MPa or more.

5. The fiber-reinforced composite material according to claim 1, which is a tape.

* * * * *